United States Patent
Chang et al.

(10) Patent No.: US 10,117,519 B2
(45) Date of Patent: *Nov. 6, 2018

(54) PORTABLE ARMREST DIVIDER AND EXPANDER

(71) Applicants: Arthur Chang, San Francisco, CA (US); Grace Chang, San Francisco, CA (US)

(72) Inventors: Arthur Chang, San Francisco, CA (US); Grace Chang, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/604,094

(22) Filed: May 24, 2017

(65) Prior Publication Data

US 2017/0258233 A1    Sep. 14, 2017

Related U.S. Application Data

(63) Continuation of application No. 14/687,902, filed on Apr. 15, 2015, now Pat. No. 9,756,946, which is a continuation-in-part of application No. 14/033,453, filed on Sep. 21, 2013.

(51) Int. Cl.
*A47C 7/54* (2006.01)
*B60N 2/75* (2018.01)

(52) U.S. Cl.
CPC ............ *A47C 7/546* (2013.01); *B60N 2/787* (2018.02)

(58) Field of Classification Search
CPC ........ A47C 7/54; A47C 7/546; B60N 2/4673; B60N 2/46; B60N 2/468; B60N 2/4686; B60N 2/4693

See application file for complete search history.

(56) References Cited

U.S. PATENT DOCUMENTS

| 3,893,729 | A | | 7/1975 | Sherman |
| 4,858,995 | A | * | 8/1989 | Young ................... B60N 2/787 297/411.23 |
| 6,827,405 | B1 | | 12/2004 | Roberts |
| 7,111,905 | B2 | | 9/2006 | Finney |
| 7,431,396 | B1 | | 10/2008 | Dasso |
| 7,568,759 | B2 | | 8/2009 | Schurg |
| 7,959,231 | B2 | | 6/2011 | Lee |
| 8,201,889 | B2 | | 6/2012 | Miranda Montalvo |
| 9,756,946 | B2 | * | 9/2017 | Chang ................... B60N 2/787 |
| 2002/0130538 | A1 | * | 9/2002 | Artsvelyan ............ B60N 2/787 297/227 |
| 2006/0038435 | A1 | | 2/2006 | Larson |
| 2012/0074756 | A1 | | 3/2012 | Sayre |
| 2013/0320722 | A1 | | 12/2013 | Lavey |
| 2014/0252821 | A1 | | 9/2014 | Friedlander |

OTHER PUBLICATIONS

International Search Report from PCTUS1530921.

* cited by examiner

*Primary Examiner* — Philip F Gabler
(74) *Attorney, Agent, or Firm* — Benjamin E. Maskell

(57) ABSTRACT

Disclosed is divider for an arm rest including two upright members with the top of the first upright member connected to a top of the second upright member at an acute angle, a bottom of the first upright member, the bottom of the first upright member spaced apart from a bottom of the second upright member, a first horizontal member, the first horizontal member hingedly connected to the bottom of the first upright member; and a second horizontal member, the second horizontal member hingedly connected to the bottom of the second upright member.

17 Claims, 14 Drawing Sheets

FIG. 13

DRAWING LEGEND

100 Armrest Divider

110 Left Side

120 Right Side

130 Section Divider

140 Mounting Strap

150 Adjustable Buckle

160 Hinge

170 Mounting Stand

180 Section Divider Connector

190 Zipper Apparatus

200 Divider Strap (optional)

210 Electronic Charging Source

PORTABLE ARMREST DIVIDER AND EXPANDER

RELATED APPLICATIONS

This application is a continuation and claims the benefit under 35 U.S.C. § 120 of U.S. patent application Ser. No. 14/687,902 filed Apr. 15, 2015 which is currently pending which a continuation-in-part and claims the benefit under 35 U.S.C. § 120 of U.S. patent application Ser. No. 14/033,453 (now abandoned), filed on Sep. 21, 2013, the entirety of the aforementioned applications are hereby incorporated by reference.

TECHNICAL FIELD OF THE DISCLOSURE

The present disclosure relates generally to the field of furniture and, more specifically, to chairs with armrests.

BACKGROUND OF THE DISCLOSURE

Row seating is employed in airplanes, movie theaters, waiting rooms, and other similar locations. Their great advantage is that they provide seating for large numbers of people in close proximity of each other.

A major disadvantage of row seating as currently offered by the industry is that the armrests are narrow and difficult to use at the same time for both people sitting in the seats on both sides of the armrests.

Another disadvantage is that these armrests are unsanitary. Though common practice is to wipe them down between movies when there is some obvious evidence of a need, e.g., some sort of liquid on the material, these armrests can go entire days without proper cleaning.

SUMMARY OF THE INVENTION

Travelers often seek some method to expand the space they take while on planes. For these individuals, the size of the armrest is nearly irrelevant—they want to take it all. For the passengers unlucky enough to be seated next to such people, travel can be very uncomfortable. Faced with pushing back against a large and often unruly individual is socially awkward and uncomfortable to many people, who tend to just tolerate the boorish behavior rather than risk an even more unpleasant plane flight by adding a tense conversation.

The frequent traveler needs a device that can increase the armrest size available to him, provide some simple barrier to the spatial encroachments by his neighbors and ensure a sanitary surface on which to rest his arms and elbows. These needs are preferably met without an undue burden to the carrying capacity of travelers. With baggage fees and limited onboard storage space a solution cannot be bulky and difficult to transport. Furthermore, another complaint among travelers is a lack of electronic charging sources. Many airports are desperately short on charging stations leaving many travelers having to choose between using their electronics for communication or entertainment. Virtually no source is located on the plane itself making multiple flight trips and long flight trips burdensome to the traveler.

This background information is provided to reveal information believed by the applicant to be of possible relevance to the present invention. No admission is necessarily intended, nor should be construed, that any of the proceeding information constitutes prior art against the present invention.

SUMMARY OF THE DISCLOSURE

The present disclosure is a portable armrest divider for use by those in row seating who desire armrests that are wider, more sanitary, or have a separation than the installed armrests provide.

Other features and advantages of the present disclosure will be apparent to those of ordinary skill in the art upon reference to the following detailed description taken in conjunction with the accompanying drawings.

For a better understanding of the disclosure, and to show by way of example how the same may be carried into effect, reference is now made to the detailed description of the disclosure along with the accompanying figures in which corresponding numerals in the different figures refer to corresponding parts and in which.

FIG. 13 contains a legend for the drawings.

DETAILED DESCRIPTION OF THE DISCLOSURE

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Those of ordinary skill in the art realize that the following descriptions of the embodiments of the present invention are illustrative and are not intended to be limiting in any way. Other embodiments of the present invention will readily suggest themselves to such skilled persons having the benefit of this disclosure. Like numbers refer to the elements throughout.

Although the following detailed description contains many specifics for the purposes of illustration, anyone of ordinary skill in the art will appreciate that many variations and alterations to the following details are within scope of the invention. Accordingly, the following embodiments of the invention are set forth without any loss of generality to, and without imposing limitations upon, the claimed invention.

In this detailed description of the present invention, a person skilled in the art should note that directional terms, such as "above," "below," "upper," "lower," and other like terms are used for the convenience of the reader in reference to the drawings. Also, a person skilled in the art should notice this description may contain other terminology to convey position, orientation, and direction without departing from the principles of the present invention.

Furthermore, in this detailed description, a person skilled in the art should note that quantitative qualifying terms such as "generally," "substantially," "mostly," and other terms are used, in general, to mean that the referred to object, characteristic, or quality constitutes a majority of the subject of the reference. The meaning of any of these terms is dependent upon the context within which it is used, and the meaning may be expressly modified.

While the making and using of various embodiments of the present disclosure are discussed in detail below, it should be appreciated that the present disclosure provides many applicable inventive concepts, which can be embodied in a wide variety of specific contexts. The disclosure is primarily described and illustrated hereinafter in conjunction with various embodiments of a folding Portable Armrest Divider 11. The specific embodiment discussed herein is, however, merely illustrative of specific ways to make and use the disclosure and do not limit the scope of the disclosure to the specific context disclosed.

Figure 1:
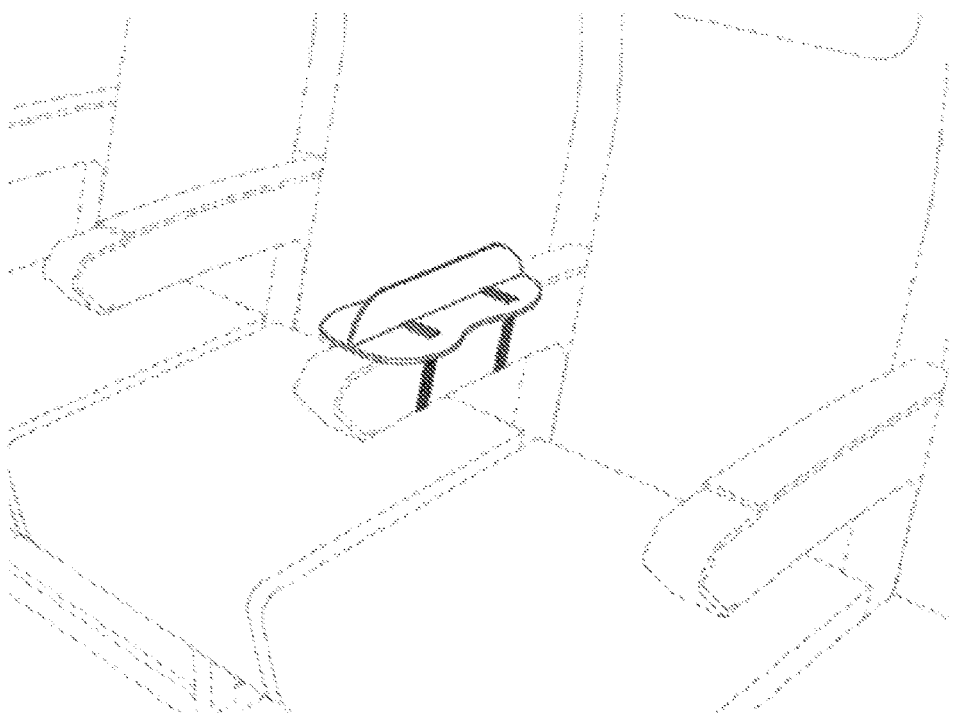
FIG. 1 is a perspective view of one embodiment of the Armrest Divider 100.
Figure 2:
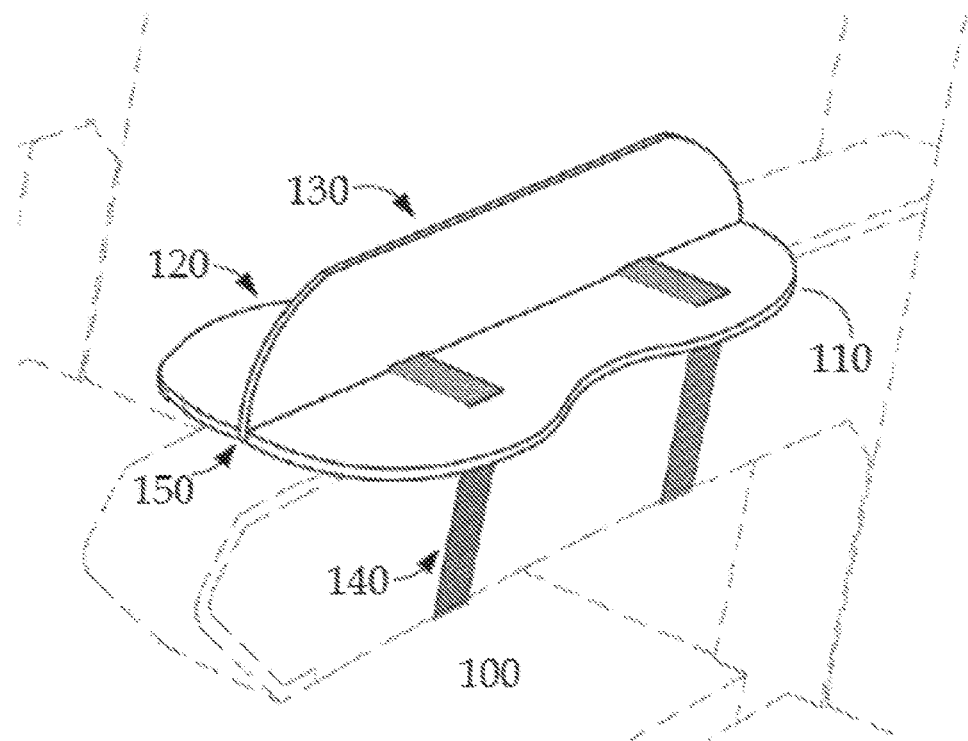
FIG. 2 is the second perspective view as FIG. 1, viewed more closely than in FIG. 1.
Figure 3:
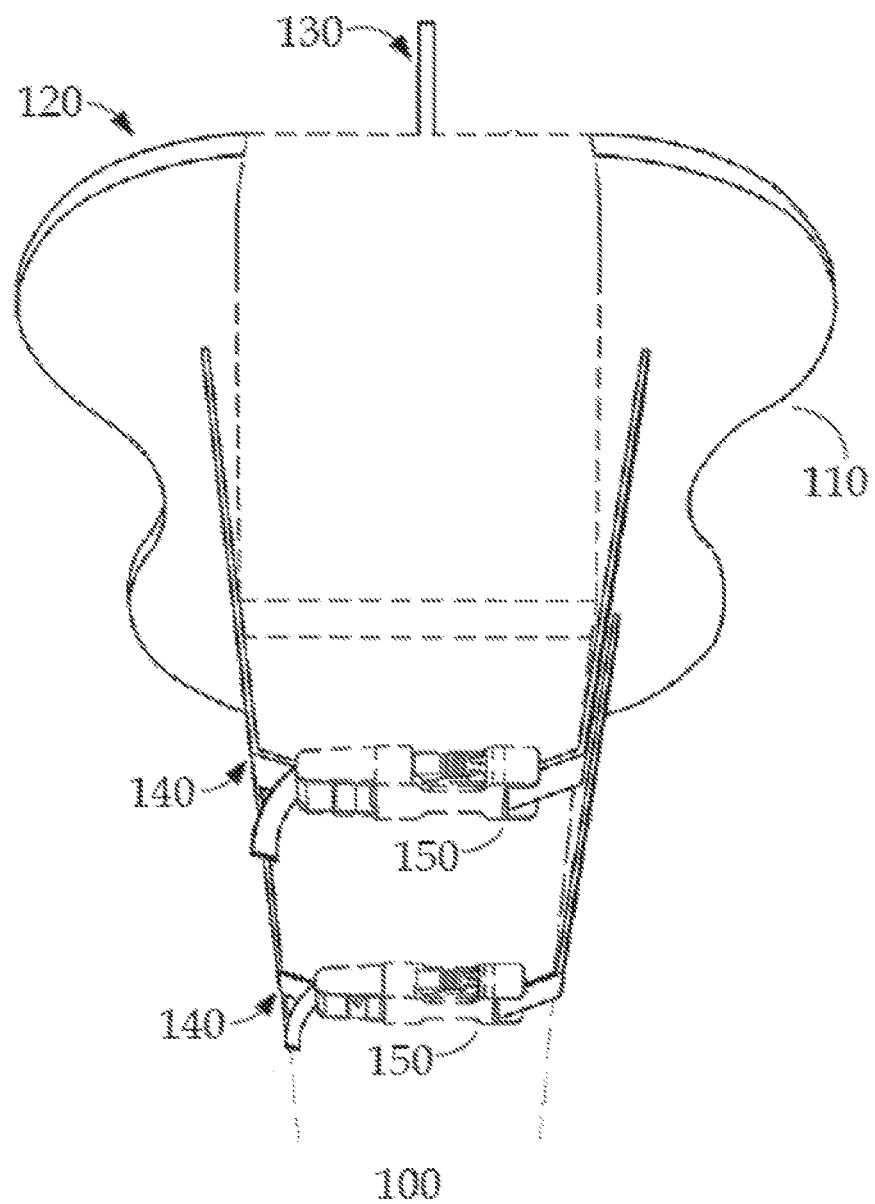
FIG. 3 is a third perspective view of the embodiment of the Armrest Divider shown in FIG. 1.

Referring now to FIGS. 1 & 2, an installed Armrest Divider, according to an embodiment of the present invention, is discussed in detail. This embodiment may comprise three flat surfaces 110, 120, 130 connected by a Hinge 160 on one straight side where they meet.

Figure 7:
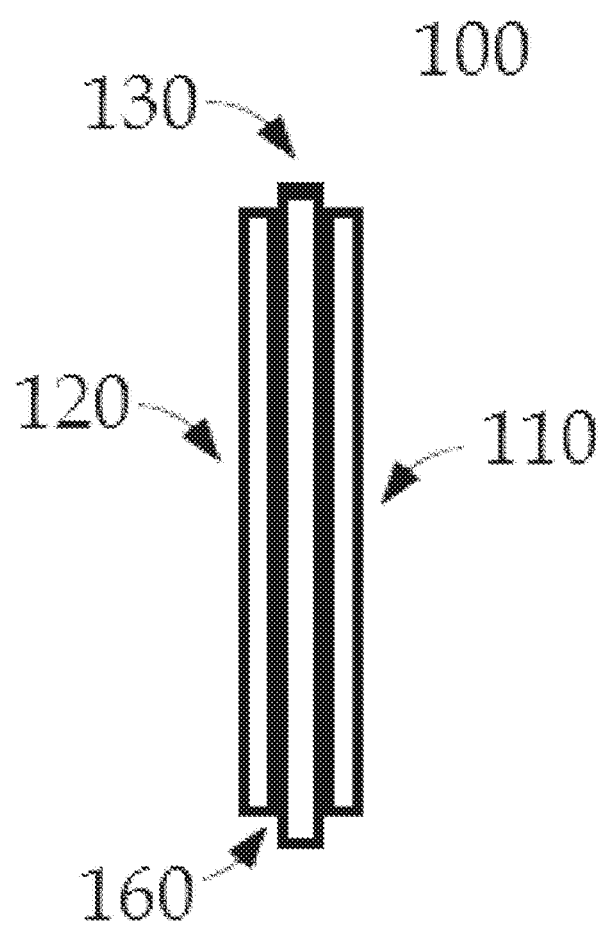
FIG. 7 shows a front view of one embodiment of the Armrest Divider 100 in the folded position (not including Mounting Strap 140 and Adjustable Buckle 150).

In the embodiment shown in the figures, the Left Side 110 and Right Side 120 are mirror images of each other, with the Section Divider 130 connectedly hinged between them so they can be folded together as a three-page book, as shown in FIG. 7, or opened fully as in FIGS. 1-3, 5, and 6, so the Left Side 110 and Right Side 120 lay flat on either side of the Section Divider 130, which acts as a middle page that is constructed to rigidly extend upwards when the Armrest Divider 100 assembly is in an open position.

The Armrest Divider 100 may be mounted on a vehicle armrest, and may be held in place by two adjustable Mounting Straps 140 that may extend from the exterior Sides 110, 120 of the Armrest Divider 100, down and around the vehicle's stock armrest, and fixed in place by an Adjustable Buckle 150 below the armrest.

The Armrest 100 may be configured to use flat inelastic Mounting Straps 140 in conjunction with the Adjustable Buckle 150, but alternative embodiments may use elastic Mounting Straps 140 and a non-adjustable buckle, or even just elastic loops that fit over a seat's armrest to hold them in place.

Figure 4:
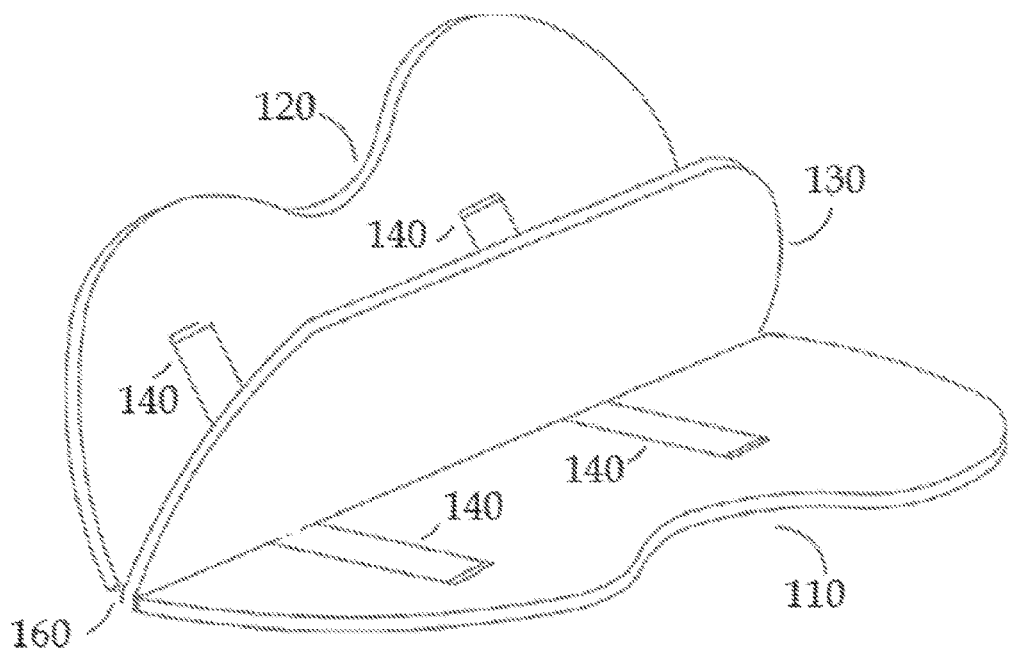
FIG. 4 is a perspective view of the embodiment of the Armrest Divider 100 partially folded.

Referring now to FIG. 4, a partially closed Armrest Divider, according to an embodiment of the invention, is now described in detail. This drawing shows a particular location for the Mounting Straps 140 going through slots in the Right and Left Sides 110, 120. (This drawing does not show the lower portion of the straps.) A person with ordinary skill in the art could locate the Mounting Straps 140 in several locations, and use the two straps as shown, or use a different number or type of straps.

Though the Left Side 110 and Right Side 120 are mirror images in this embodiment, the invention does not require that the two sides be alike. The three parts of the Armrest Divider 100 can be all three alike, or substantially different, except that all three of the major components must attach together on one side.

Figure 5:
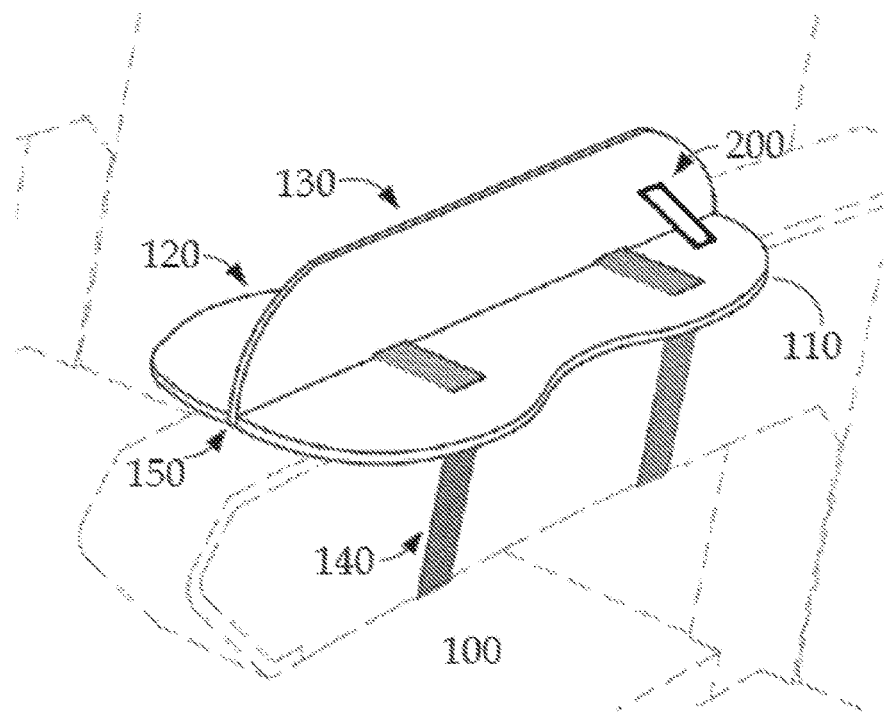
FIG. 5 shows a perspective view of one embodiment of the Armrest Divider 100 with optional embodiment including a Divider Strap 200.
Figure 6:
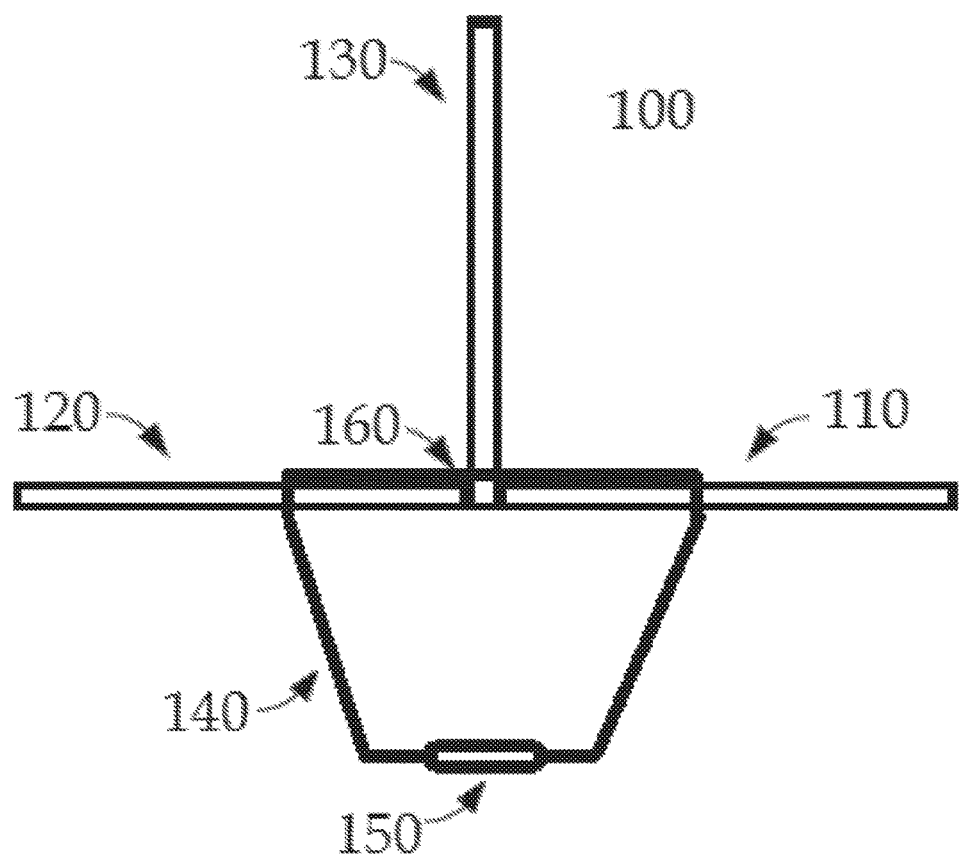
FIG. 6 shows a front view of one embodiment of the Armrest Divider 100.

The Armrest Divider 100 may be constructed to hold the central Section Divider 130 vertically in place. There are many means for holding the Section Divider 130 vertical, including the use thick, hinged surfaces as demonstrated and shown in FIGS. 6 and 7, or using Divider Straps 200 that keep the Section Divider 130 upright when the sides are open, as shown in FIG. 5. The applicant asserts that a person having ordinary skill in the art could employ a multitude of constructions of the Armrest Divider 100 that allow it to close into an essentially flat product, and open such that the Section Divider 130 is held upright when the Left and Right Sides 110, 120 are opened.

One embodiment of the Armrest Divider 100, may comprise a user mounting the invention by: 1) opening the Left and Right Sides 110 and 120, 2) locating the Armrest Divider 100 on top of the armrest on which the Armrest Divider 100 is to be mounted, 3) joining the two ends of the Mounting Straps 140 under the armrest using the Adjustable Buckle 150, and 4) tightening the Mounting Straps 140 so the Armrest Divider 100 is held in place.

To remove the Armrest Divider 100 from a mounted position on a vehicle armrest, a user may simply release the Adjustable Buckle 150, fold the Armrest Divider 100, and pick up the folded Armrest Divider 100 for storage.

Figure 8:
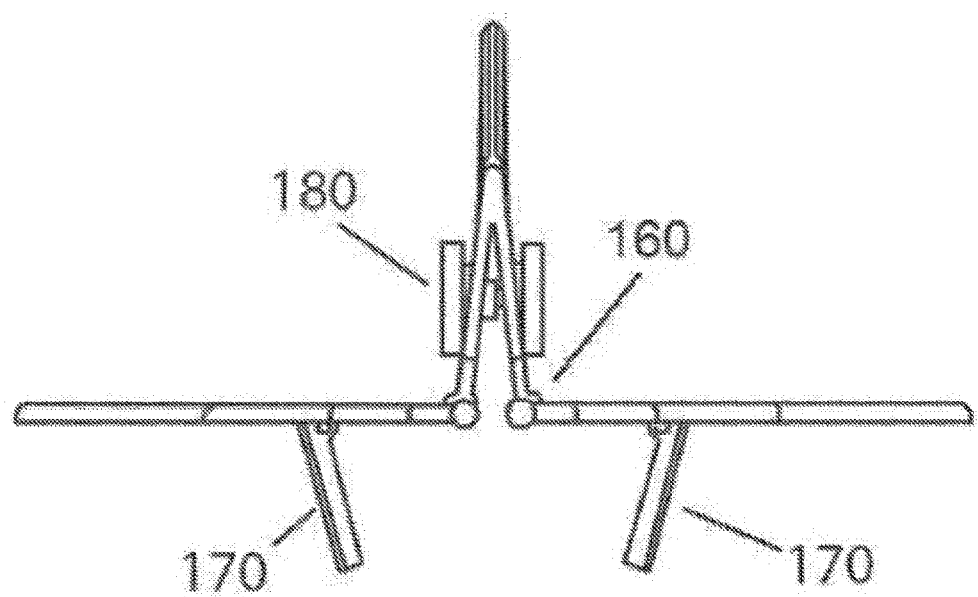
FIG. 8 shows a front view of a second embodiment of the Armrest Divider 100 in an Open position.

Referring now to FIG. 8, a front view of an Armrest Divider 100 in an Open position, according to an embodiment of the invention, is discussed in detail. In one embodiment of the invention, the Armrest Divider 100 may comprise Left and Right Sides 110 and 120 that may fold up from their Closed position. The Closed position may be represented by FIG. 9 and discussed in detail below. The Left and Right Sides 110 and 120 may be supported by Mounting Stands 170 that may be pressed against the armrest. Tension between the Mounting Stands 170 and the armrest may provide a stable and stationary base for the multiple armrests created by the Armrest Divider 100. In one embodiment of the invention, as presented in FIG. 8, the Section Divider 130 may comprise two or more flat surfaces. The two or more flat surfaces of the Section Divider 130 may be coupled by a Section Divider Connector 180. The Section Divider Connector 180 may comprise at least one of, but not limited to, a screw mechanism, a snapping mechanism, a magnetic mechanism, and a Velcro mechanism.

Figure 9:
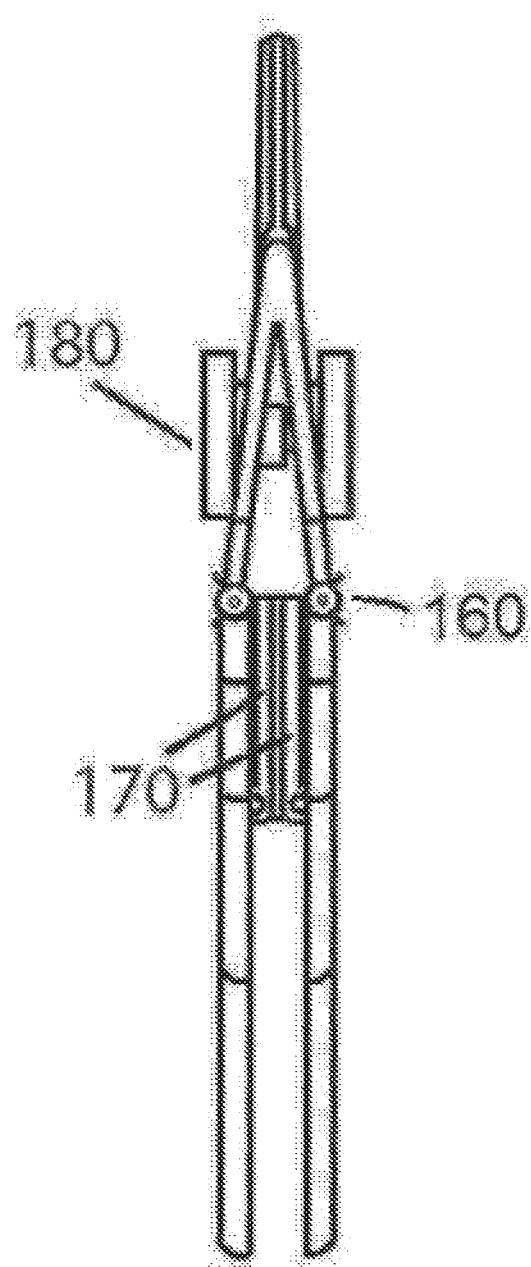
FIG. 9 shows a front view of a second embodiment of the Armrest Divider 100 in a Closed position.

Referring now to FIG. 9, a front view of an Armrest Divider 100 in a Closed position, according to an embodiment of the invention, is discussed in detail. The Left and Right Sides 110 and 120 may fold down from the Open position in on embodiment of the invention. The Mounting Stands 170 may fold internal to the Left and Right Sides 110 and 120. Throughout the disclosure the Left and Right Sides 110 and 120 may also be referred to as the first rigid flat surface and the second rigid flat surface.

Figure 10:
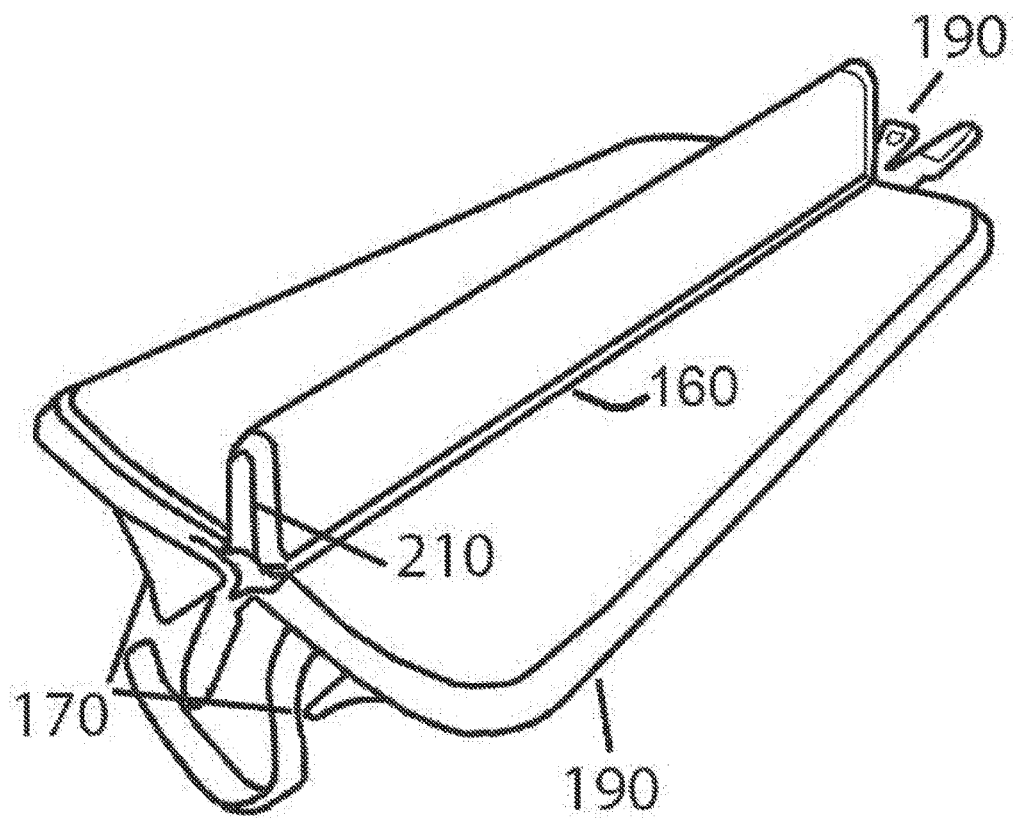
FIG. 10 shows a perspective view of a third embodiment of the Armrest Divider 100.
Figure 10A:
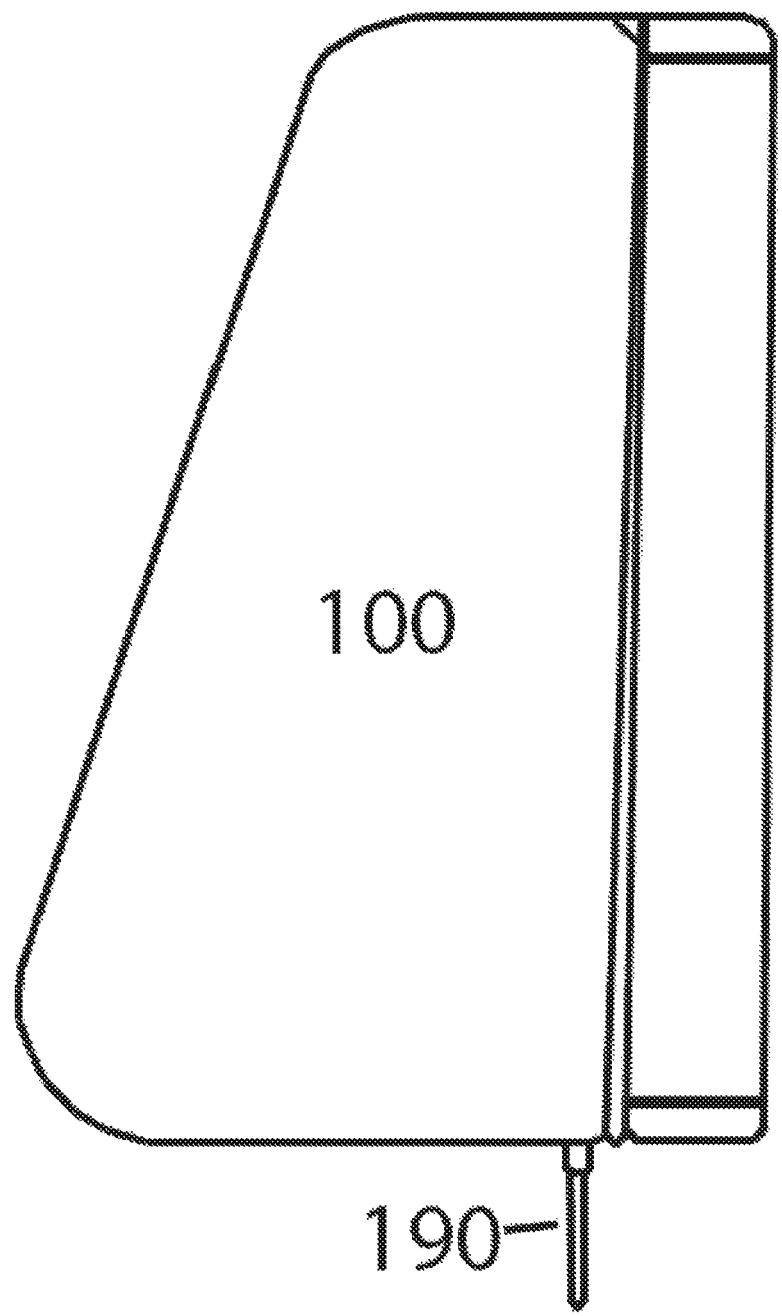
FIG. 10A shows a top view of the third embodiment of the Armrest Divider 100 shown in FIG. 10.

Referring now to FIG. 10 and FIG. 10A, a diagram of an Armrest Divider 100, according to an embodiment of the invention, is discussed in detail. In one embodiment of the invention, the Armrest Divider 100 may comprise a Zipper Apparatus 190 for securing the Armrest Divider 100 in the Closed position. The Armrest Divider 100 may further comprise an Electronic Charging Source 210. The Zipper Apparatus 190 may be configured to run along an outer edge of the Left and Right sides 110 and 120. The Zipper Apparatus 190 may be configured to secure the Left and Right Sides 110 and 120 to each other. The Zipper Apparatus may be further configured to provide a pouch or carrying case, further enhancing the use of the Armrest Divider 100 when it is not mounted to an armrest. One of ordinary skill in the art can appreciate that there are a plurality of means for securing the Armrest Divider 100 in the Closed position that may be used in the same manner as the Zipper Apparatus.

The Electronic Charging Source 210 may comprise at least one of, but not limited to, a universal serial bus (USB) port, an alternating current (AC) outlet, and a direct current (DC) outlet. The Electronic Charging Source 210 may provide a USB port familiar to the charging mechanism for a plurality of phones and tablets. The Electronic Charging Source 210 may be electronically coupled to an internal power source. The internal power source may comprise a rechargeable battery. The Electronic Charging Source 210 and the internal power source may both be configured to be housed in the Section Divider. One of ordinary skill in the art can appreciate that there are a plurality of power sources, electronic adapters, ports, and outlets that may serve the same purpose as the USB port and rechargeable battery. Furthermore, one of ordinary skill in the art can appreciate that both of these items may be placed in a plurality of locations within or upon the Armrest Divider 100 without changing the function of those items or the Armrest Divider 100.

Figure 11:
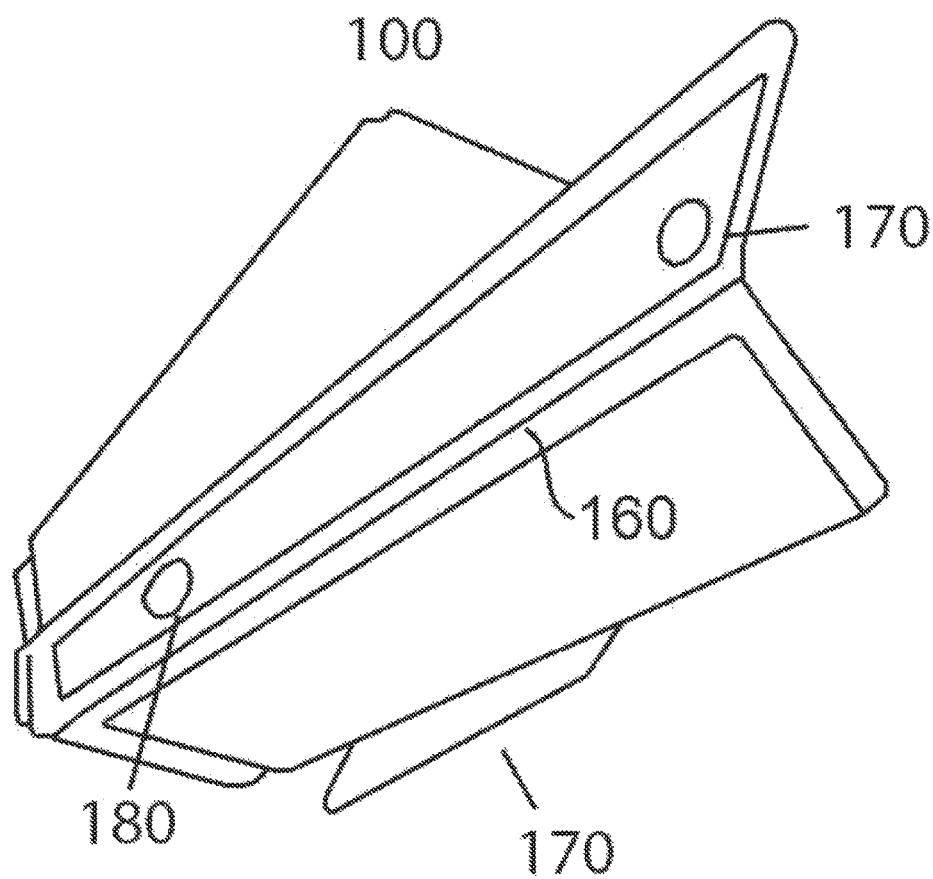
FIG. 11 is a perspective view of a fourth embodiment of the Armrest Divider 100.
Figure 12:
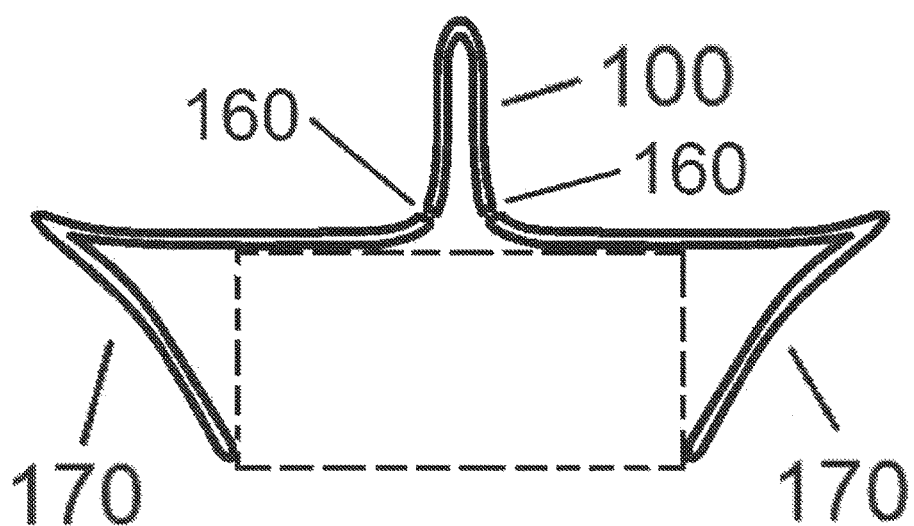
FIG. 12 is a front view of the fourth embodiment of the Armrest Divider 100 shown in FIG. 11.

FIGS. 11 and 12 show yet another potential embodiment. In this embodiment, the Mounting Stand 170 extends from the Right Side 120 and Left Side 110 and hold the Armrest Divider in place using the tension of the Mounting Stands 170 against an armrest on which the device is mounted.

The Armrest Divider 100 may be configured to comprise a plurality of external designs. The designs may comprise a plurality of fashionable and/or functional concepts including but not limited to, rubberized coating for additional grip, vintage leather, sports teams, corporate insignia, personal initials, and many more custom ideas. Additionally, the Armrest Divider 100 may comprise other functional add-ons including, but not limited to, a handle, mirror, calculator, notepad, writing utensil holder, business card holder, and many more custom ideas.

It is considered within the ambit of one skilled in the art to construct an Armrest Divider 100 that uses other methods of holding the invention in place. For example, for row seats that have a construction disallowing the straps from encircling the stock armrest, a set of fold-out rails that extend from the bottom of the Left and Right Sides 110 and 120, or a pair of spring-loaded clamps attached at the ends of the device that extend down and grasp the stock armrest.

Some of the illustrative aspects of the present invention may be advantageous in solving the problems herein described and other problems not discussed which are discoverable by a skilled artisan. While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

What is claimed is:

1. A divider for an arm rest, the divider comprising:
a first upright member;
a second upright member;
a top of the first upright member, the top of the first upright member connected to a top of the second upright member at an acute angle;
a bottom of the first upright member, the bottom of the first upright member spaced apart from a bottom of the second upright member;
a first horizontal member, the first horizontal member hingedly connected to the bottom of the first upright member; and
a second horizontal member, the second horizontal member hingedly connected to the bottom of the second upright member.

2. The divider of claim 1 wherein each of the first horizontal member and the second horizontal member have a first end and a second end and wherein the respective first ends are wider than the second ends.

3. The divider of claim 2 wherein the connector is configured to maintain a space between the bottom of the first upright member and the bottom of the second upright member.

4. The divider of claim 2 further comprising:
a second connector extending between the first upright member and the second upright member.

5. The divider of claim 1 further comprising:
a first clamp member hingedly connected to an underside of the first horizontal member; and
a second clamp member hingedly connected to an underside of the first horizontal member.

6. The divider of claim 1 further comprising:
a first connector extending between the first upright member and the second upright member.

7. The divider of claim 1 further comprising:
a zipper connecting the first horizontal member and the second horizontal member;
wherein the zipper comprises a first zipper portion and a second zipper portion;
wherein the first zipper portion is disposed on the first horizontal member; and
wherein the second zipper portion is disposed on the second horizontal member.

8. The divider of claim 1 wherein the divider is configured to be disposed in one of an open position for attachment to the arm rest and a closed position for stowage.

9. The divider of claim 8 wherein, in the open position, the first and second upright members are substantially perpendicular to the first and second horizontal members and wherein, in the closed position, the first and second upright members are substantially parallel to the first and second horizontal members.

10. A six-panel divider for an arm rest, the divider comprising:
an upright member comprising
a first panel and having a first edge and a second edge;
a second panel having a third edge and a fourth edge;
a first armrest member comprising a third panel having a fifth edge;
a second armrest member comprising a fourth panel having a sixth edge;
wherein the first edge of the first panel is flexibly connected to the third edge of the second panel;
wherein the fifth edge of the third panel is hingedly connected to the second edge of the first panel;
wherein the sixth edge of the fourth panel is hingedly connected to the fourth edge of the second panel;
a first clamping member comprising a fifth panel having a seventh edge;
a second clamping member comprising a sixth panel having an eighth edge;
wherein the seventh edge of the fifth panel is hingedly connected to the third panel;
wherein the eighth edge of the sixth panel is hingedly connected to the fourth panel; and
a connector connecting the first panel to the second panel, the connector configured to squeeze the second edge of the first panel towards the fourth edge of the second panel, and, thereby, squeeze the first clamping member towards the second clamping member.

11. The six-panel divider of claim 10:
wherein the third panel further comprises a seventh edge having a first zipper portion; and
wherein the fourth panel further comprises an eighth edge having a second zipper portion.

12. The six-panel divider of claim 10:
wherein each of the third panel and the second panel have a first end and a second end; and
wherein the respective first ends are wider than the second ends.

13. The six-panel divider of claim 10 wherein the six-panel divider is configured to be disposed in one of an open position for attachment to the arm rest and a closed position for stowage.

14. The six-panel divider of claim 13 wherein, in the open position, the first and second panels are substantially perpendicular to the third and fourth panels and wherein, in the closed position, the first and second panels are substantially parallel to the third and fourth panels.

15. A divider for an arm rest, the divider comprising:
a section divider having a first side member and a second side member;
a left side member hingedly connected to a bottom of the section divider;
a right side member hingedly connected to the bottom of the section divider;
a first section divider connector connecting the first side member to the second side member;
wherein the divider is configured to be disposed in one of an open position for attachment to the arm rest and a closed position for stowage;
wherein, in the open position, the first and second side members of the section divider are substantially perpendicular to the first and second side members;
wherein, in the closed position, the first and second side members of the section divider are substantially parallel to the left and right side members; and
a first mounting stand hingedly connected to a bottom of the left side member; and
a second mounting stand hingedly connected to a bottom of the right side member.

16. The divider for an arm rest of claim 15 further comprising:
a first strap having a first buckle portion connected to a first side of the section divider;
a second strap having a second buckle portion connected to a second side of the section divider; and
wherein the first and second strap the first and second buckle portions are configured to releasably secure the divider to the arm rest.

17. The divider of claim 1 further comprising:
a first strap having a first buckle portion connected to a first side of the first upright member;
a second strap having a second buckle portion connected to a second side of the second upright member; and
wherein the first and second strap the first and second buckle portions are configured to releasably secure the divider to the arm rest.

\* \* \* \* \*